United States Patent
Zink et al.

(10) Patent No.: US 11,977,811 B2
(45) Date of Patent: May 7, 2024

(54) CONTROLLING CHARACTERISTICS OF LIGHT OUTPUT FROM LED WALLS

(71) Applicant: Warner Bros. Entertainment Inc., Burbank, CA (US)

(72) Inventors: Michael Zink, Altadena, CA (US); Michael Smith, Hermosa Beach, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 39 days.

(21) Appl. No.: 17/685,314

(22) Filed: Mar. 2, 2022

(65) Prior Publication Data

US 2022/0382502 A1    Dec. 1, 2022

Related U.S. Application Data

(60) Provisional application No. 63/156,353, filed on Mar. 3, 2021.

(51) Int. Cl.
| | |
|---|---|
| *G06F 3/147* | (2006.01) |
| *G06F 3/14* | (2006.01) |
| *G06T 7/60* | (2017.01) |
| *H04N 5/222* | (2006.01) |

(52) U.S. Cl.
CPC ............ *G06F 3/147* (2013.01); *G06F 3/1446* (2013.01); *G06T 7/60* (2013.01); *H04N 5/2228* (2013.01)

(58) Field of Classification Search
CPC .............. G09G 3/2003; G09G 3/3208; G09G 2310/027; G09G 2320/0233; G09G 2360/145; G09G 2320/0693; G06T 7/80
See application file for complete search history.

(56) References Cited

U.S. PATENT DOCUMENTS

| | | | |
|---|---|---|---|
| 10,019,786 B2 * | 7/2018 | Suzuki | H04N 1/407 |
| 2019/0066555 A1 * | 2/2019 | Gu | G09G 3/006 |
| 2019/0385544 A1 * | 12/2019 | Tan | G09G 3/3607 |
| 2021/0027751 A1 * | 1/2021 | Tang | G09G 5/14 |
| 2021/0327343 A1 * | 10/2021 | Han | G09G 3/3225 |

* cited by examiner

*Primary Examiner* — Antonio A Caschera
(74) *Attorney, Agent, or Firm* — Bookoff McAndrews, PLLC

(57) ABSTRACT

A computer-generated scene is generated as background for a live action set, for display on a panel of light emitting diodes (LEDs). Characteristics of light output by the LED panel are controlled such that the computer-generated scene rendered on the LED panel, when captured by a motion picture camera, has high fidelity to the original computer-generated scene. Consequently, the scene displayed on the screen more closely simulates the rendered scene from the viewpoint of the camera. Thus, a viewpoint captured by the camera appears more realistic and/or truer to the creative intent.

20 Claims, 8 Drawing Sheets

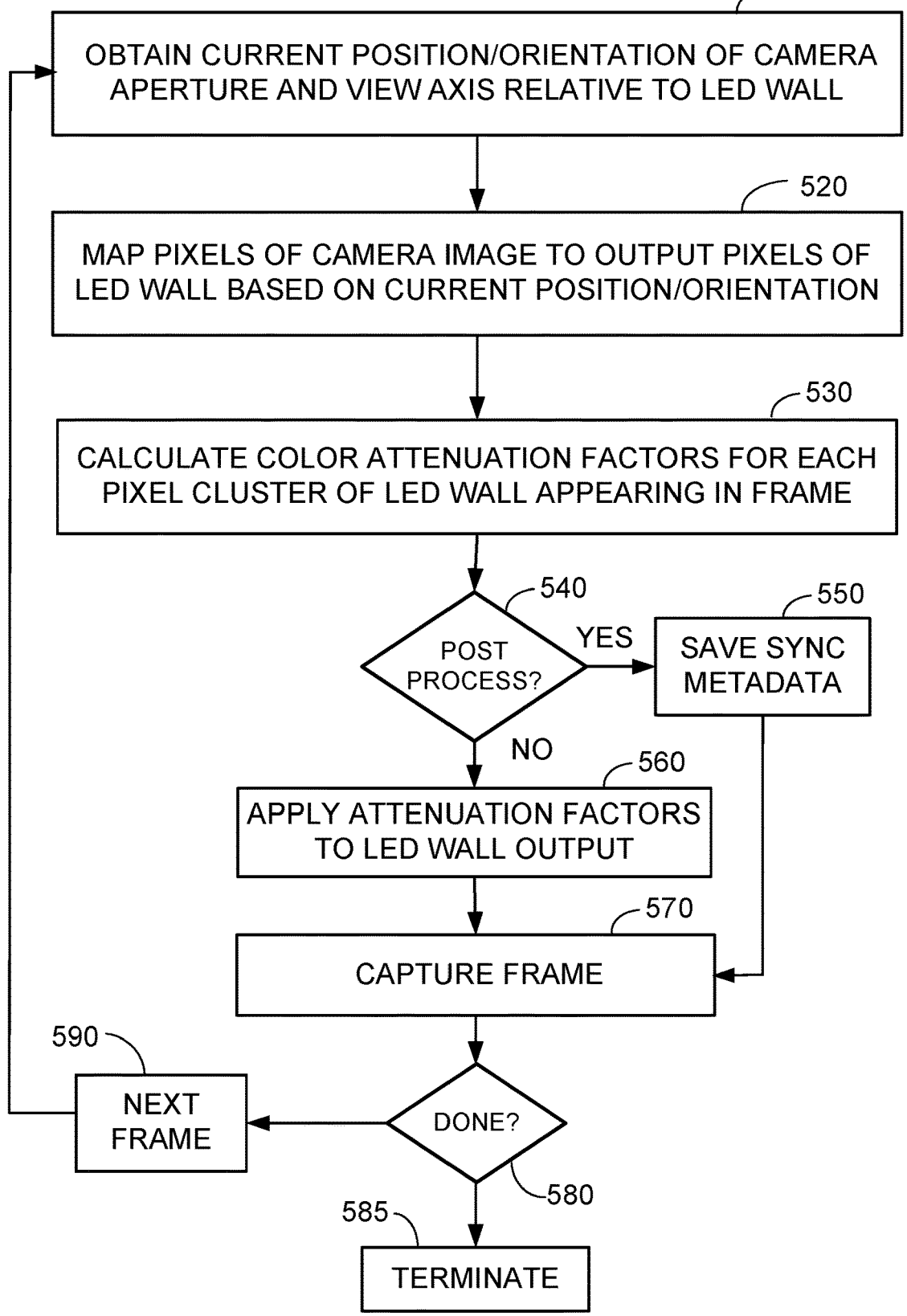

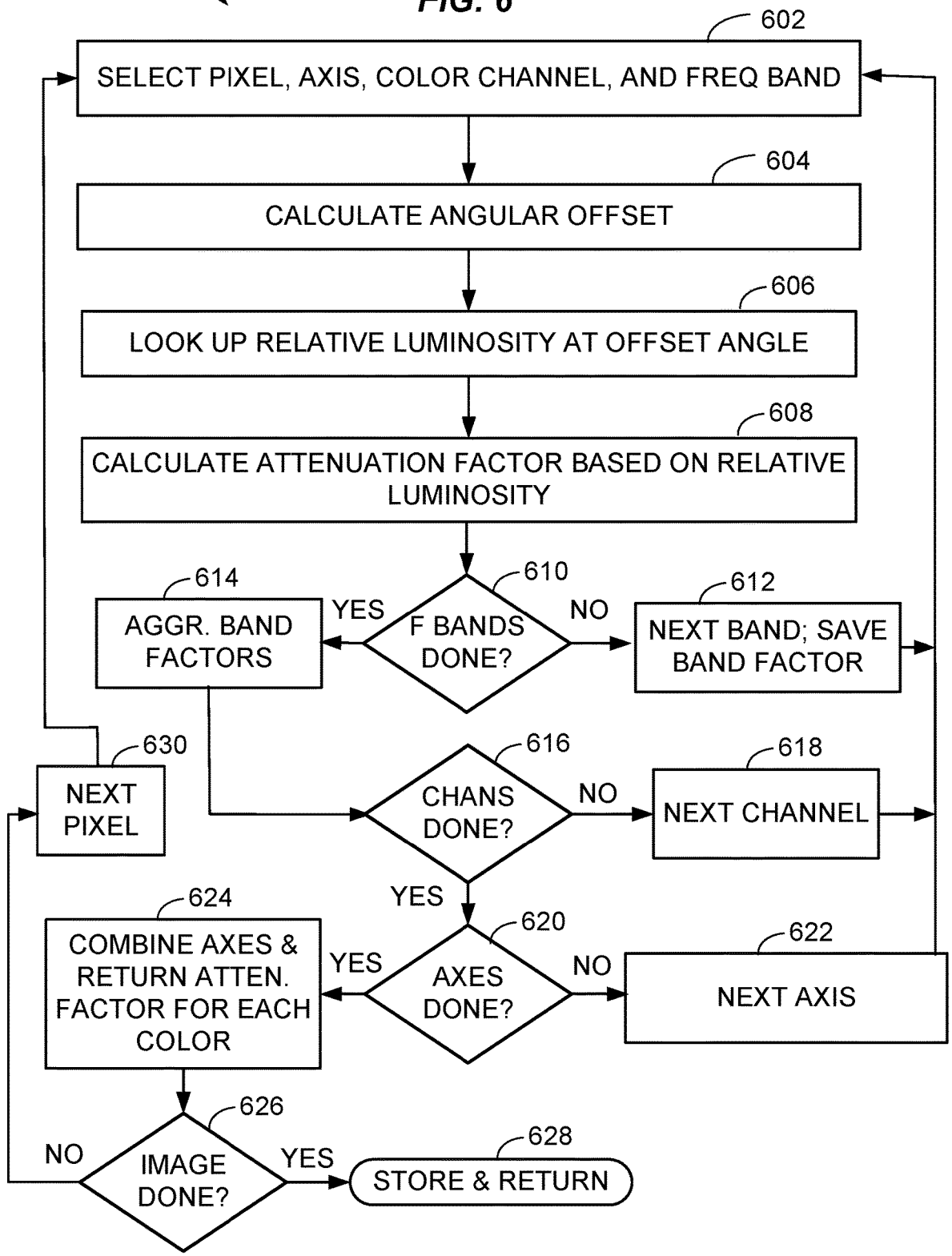

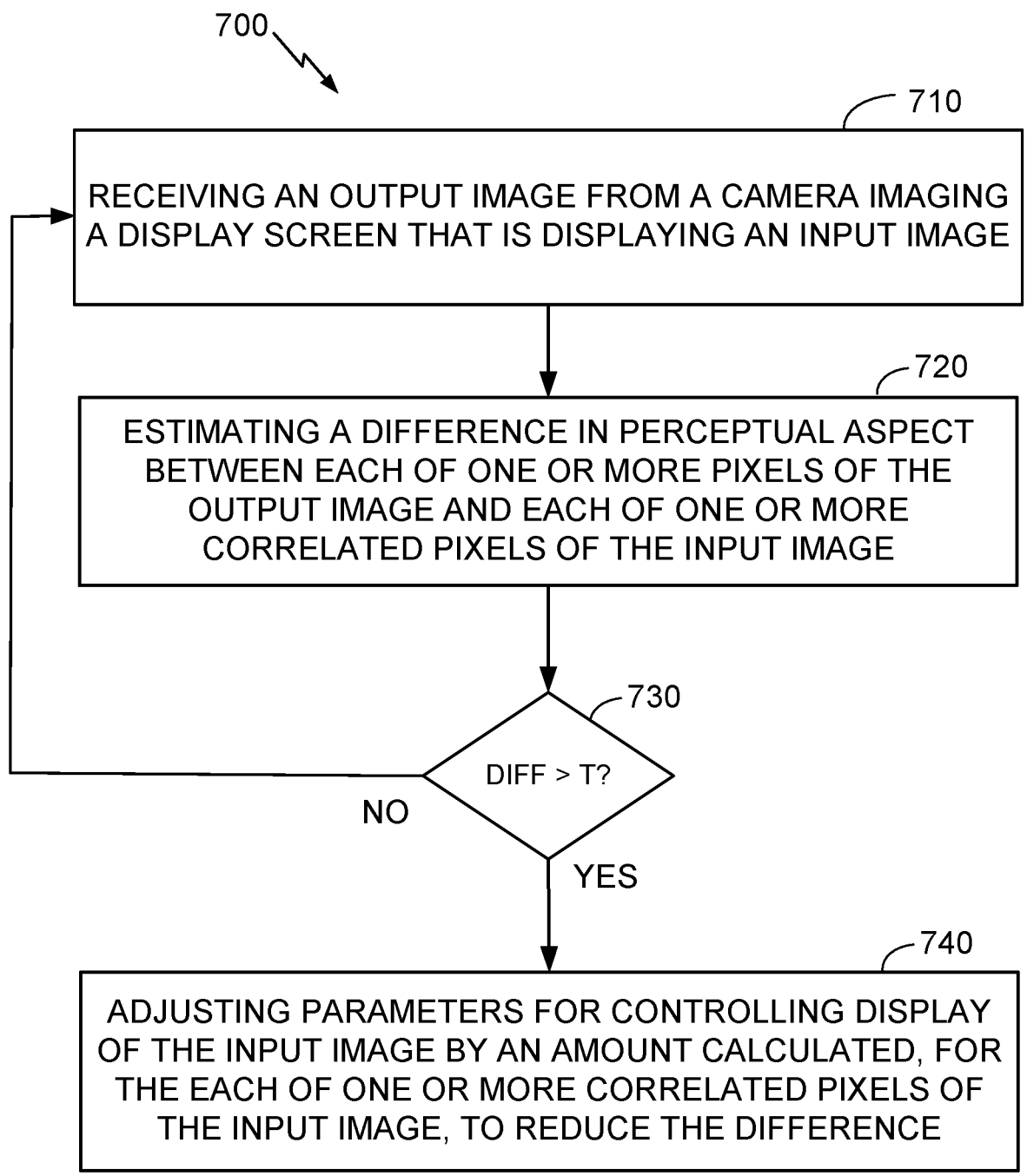

810 CORRELATING EACH OF THE ONE OR MORE PIXELS OF THE OUTPUT IMAGE TO CORRESPONDING ONES OF THE ONE OR MORE PIXELS OF THE INPUT IMAGE

830 CORRELATING GROUPS OF ADJACENT PIXELS OF THE OUTPUT IMAGE TO CORRESPONDING GROUPS OF ADJACENT PIXELS OF THE INPUT IMAGE

820 CORRELATING INDIVIDUAL PIXELS OF THE OUTPUT IMAGE TO CORRESPONDING INDIVIDUAL PIXELS OF THE INPUT IMAGE

1010 OPTIMIZING BRIGHTNESS OF THE DISPLAY WHILE PREVENTING UNINTENDED VARIANCE BETWEEN ADJACENT PIXELS FROM EXCEEDING A PERCEPTUAL THRESHOLD

1020 PERFORMING THE RECEIVING, ESTIMATING, AND ADJUSTING SEPARATELY FOR AT LEAST TWO CAMERAS IMAGING THE DISPLAY SCREEN AT SEPARATE INSTANTS BY SYNCHRONIZED CAMERA SHUTTERS

910
THE ESTIMATING IS BASED ON A GEOMETRIC RELATION BETWEEN THE CAMERA AND ONE OR MORE CORRELATED PIXELS OF THE INPUT IMAGE ON THE DISPLAY SCREEN

920
DETERMINING THE GEOMETRIC RELATION BASED ON A CURRENT CAMERA POSITION AND ORIENTATION RELATIVE TO THE DISPLAY SCREEN

930
DETERMINING THE CURRENT CAMERA METRICS BASED ON AT LEAST ONE OF: A PREDETERMINED CAMERA MOTION PLAN OR SENSOR DATA INDICATING POSITION AND ORIENTATION

940
THE GEOMETRIC RELATION COMPRISES AN ANGULAR OFFSET BETWEEN THE CAMERA AND THE ONE OR MORE CORRELATED PIXELS OF THE INPUT IMAGE ON THE DISPLAY SCREEN

950
THE ESTIMATING COMPRISES LOOKING UP THE DIFFERENCE IN PERCEPTUAL ASPECT BASED AT LEAST IN PART ON THE ANGULAR OFFSET

960
THE ESTIMATING COMPRISES CALCULATING THE DIFFERENCE IN PERCEPTUAL ASPECT BASED ON A CONTINUOUS FUNCTION OF THE ANGULAR OFFSET

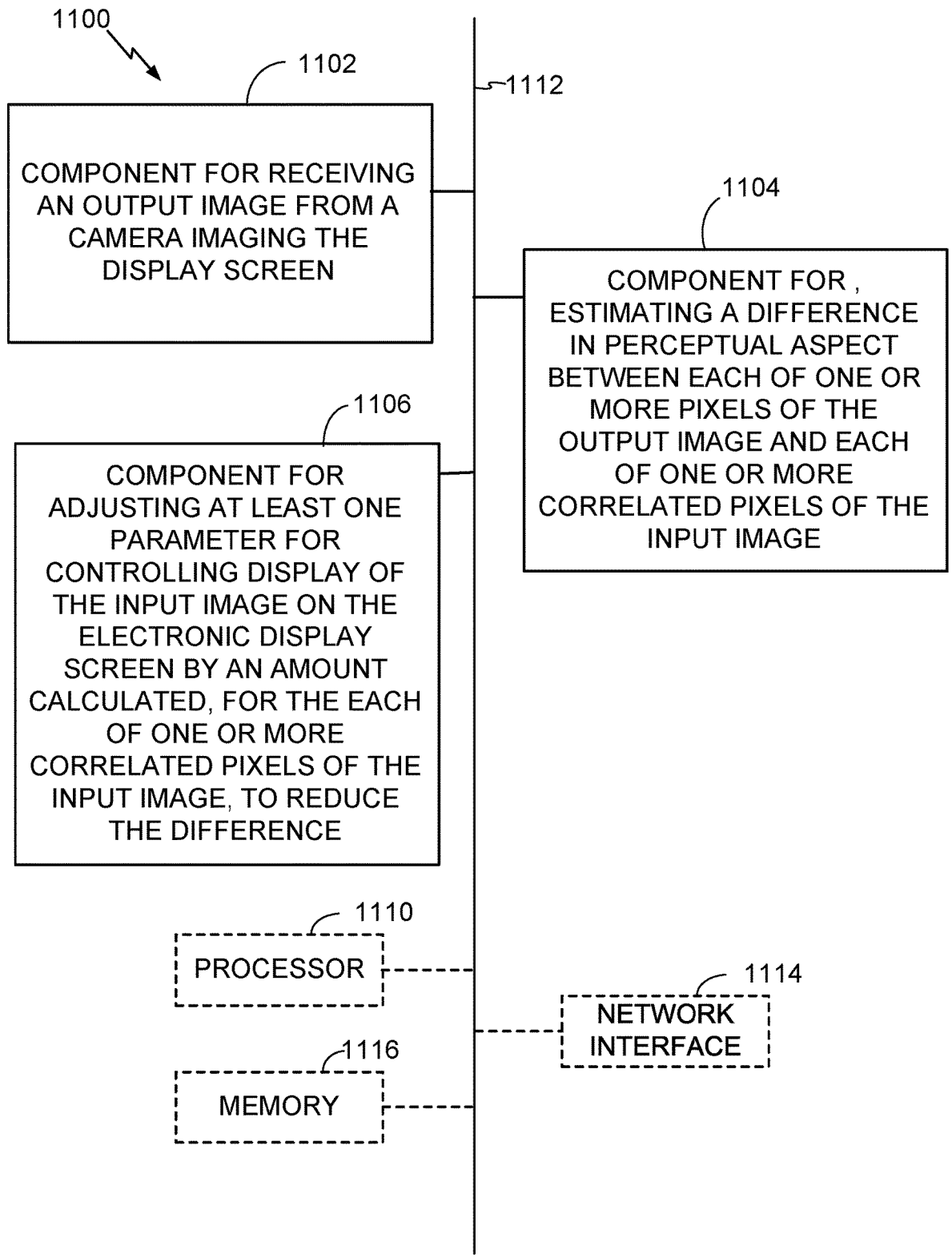

US 11,977,811 B2

CONTROLLING CHARACTERISTICS OF LIGHT OUTPUT FROM LED WALLS

PRIORITY CLAIM

The present application claims priority to U.S. Provisional Application No. 63/156,353 filed Mar. 3, 2021, which is incorporated herein in its entirety by reference.

FIELD

The present application relates to methods and systems for video production with a light-emitting diode (LED) computer-generated background display units.

BACKGROUND

Historically, film production has followed a linear path from pre-production to production to post-production. However, as technology has progressed a variety of new hardware devices and software applications are available that provide a more agile and less linear workflow for how the film is produced. The new hardware devices and software applications give the film maker the ability to mix live footage with real-time computer graphics on set. The process of producing movies by mixing live footage along with a range of computer-aided production and visualization methods is referred to as virtual production. Virtual production (VP) combines virtual and augmented reality with CGI and game-engine technologies to enable production crews to see their scenes unfold as they are composed and captured on set.

One implementation of a VP work flow includes generating data (e.g., cityscape, natural landscapes, virtual characters, etc.) for a scene using computer hardware devices and software applications; rendering the computer generated backgrounds on a rendering device, such as, for example a LED wall; and capturing a footage of actors enacting the scene in front of the rendered background using a movie camera.

A common rendering device used in virtual production is a LED wall. A LED wall comprises multiple LED display units, each LED display unit comprising a plurality of light emitting diodes (LEDs). A controller is provided to control the multiple LED display units and/or each of the plurality of light emitting diodes (LEDs) of the multiple LED display units. The rendered scene captured by the camera may differ in brightness (sometimes called luminosity) and color from the scene generated by the virtual data generator. The LED display units can exhibit viewing angle dependent color shift and/or viewing angle dependent shift in brightness. This viewing angle dependent color shift/brightness in the light output from the LED display units can degrade the images captured by the movie camera. For example, if the movie camera is capturing the rendered scene from an off-axis position (e.g., greater than ±45 degrees from a normal to the LED display unit) the color and/or brightness of various portions of the rendered scene may be different from the color/brightness of the generated scene. In addition to undesirable aesthetic effects, the viewing angle dependent color shift/brightness in the light output from the LED display units can also increase cost of virtual production for example due to the cost of fixing the issue using post-capture color correction steps, and also improve the suspension of disbelief which helps keep the viewer believe they are not viewing a LED wall screen with background display and instead viewing the images corresponding to a camera capturing a real scene.

It would be desirable, therefore, to develop new methods, systems and other new technologies for controlling LED background display units in video production, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, method for controlling individual pixels of an electronic display screen displaying an input image may include receiving, by at least one processor, an output image from a camera capturing the display screen using any suitable photographic imaging process providing a digital image output. The method may further include estimating, by the at least one processor, a difference in perceptual aspect between each of one or more pixels of the output image and each of one or more correlated pixels of the input image. The method may further include adjusting, by the at least one processor, at least one parameter (for example, pixel luminosity) for controlling display of the input image on the electronic display screen by an amount calculated, for the each of one or more correlated pixels of the input image, to reduce the difference.

In related aspects, the method may include correlating, by the at least one processor, the each of the one or more pixels of the output image to corresponding ones of the one or more pixels of the input image. The correlating may correlate individual pixels of the output image to corresponding individual pixels of the input image. In an alternative, or in addition, the correlating correlates clusters of adjacent pixels of the output image to corresponding clusters of adjacent pixels of the input image.

In another aspect, the estimating is based on a geometric relation between the camera and one or more correlated pixels of the input image on the display screen. Thus, the method may further include determining the geometric relation based on a current camera position and orientation relative to the display screen. For example, the method may include determining the camera position and orientation based on at least one of a predefined plan for motion of the camera, or sensor data indicating position and orientation of the camera. The geometric relation may be, or may include, a smooth function across neighboring pixels.

In a related aspect, the geometric relation may include an angular offset between the camera and the one or more correlated pixels of the input image on the display screen. The estimating may include looking up the difference in perceptual aspect based at least in part on the angular offset. In an alternative, or in addition, the estimating may include calculating the difference in perceptual aspect based on a continuous function of the angular offset, which should be a smooth function.

In other aspects, the adjusting may include optimizing brightness of the display while preventing unintended variance between adjacent pixels from exceeding a perceptual threshold.

In some embodiments, the receiving, estimating, and adjusting are performed separately for at least two cameras imaging the display screen at separate instants by synchronized camera shutters.

An apparatus for controlling individual pixels of an electronic display screen displaying an input image, comprising at least one processor coupled to a memory and to a camera output, wherein the memory holds program instructions, that when executed by the at least one processor, cause the apparatus to perform operations of the methods as described herein.

As used herein, an apparatus for performing a method includes at least a computer processor coupled to a non-transitory memory and to one or more ports, including at least one input port for a camera or for data from a camera and at least one output supplying a video signal to an LED wall or similar electronic display screen. A computer processor may include, for example, a microprocessor, microcontroller, system on a chip, or other processing circuit. As used herein, a "processor" means a computer processor. An apparatus or system for performing the method may include one or more location and/or inertial sensors incorporated into a motion tracking component. The motion tracking component may provide camera position and orientation data to the apparatus for use in processing the video signal from the camera.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 5 is a flow chart illustrating operations of a method for controlling pixels of an LED wall based on angle of emission relative to a camera.

FIG. 6 is a flow chart illustrating operations of a method for determining luminosity attenuation factors for pixels of an LED wall.

FIG. 7 is a flow chart further illustrating operations of a method controlling pixels of an LED wall providing a backdrop for a camera.

FIGS. 8-10 are flow charts illustrating additional operations of the method illustrated by FIG. 7.

FIG. 11 is a conceptual block diagram illustrating components of an apparatus or system for controlling pixels of an LED wall.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

Figure 1:
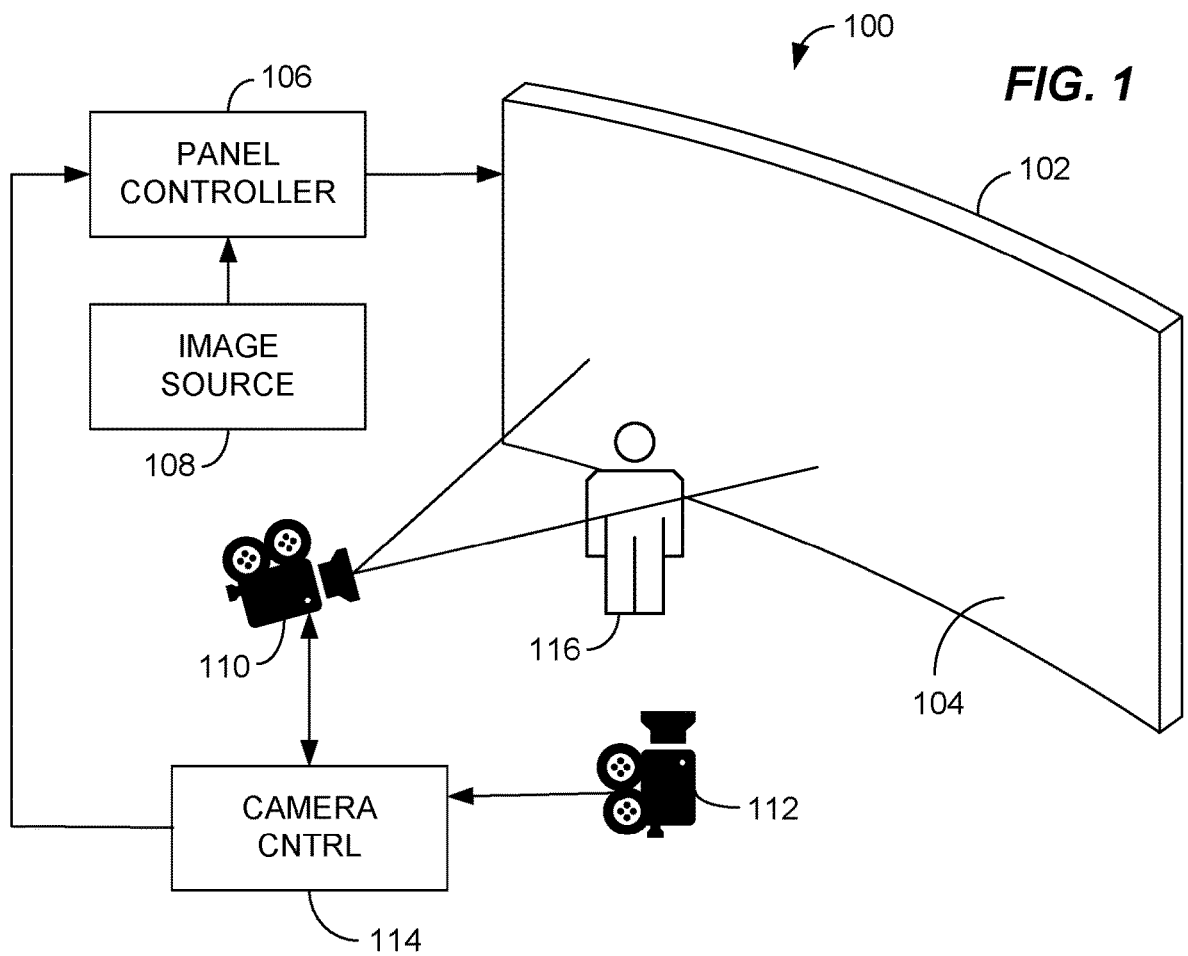
FIG. 1 is a schematic diagram illustrating aspects of a video production scene with an LED wall and video cameras.

FIG. 1 shows a video production scene and system 100 including an LED wall 102, also called an LED backdrop or panel, including a large LED display 104 with individually addressable pixels controlled by a panel controller 106. Suitable panel controllers are commercially available, for example from Brompton Technology, London, U.K., and may be programmed to perform pixel control according to methods described herein. In an alternative, the controller may be embedded as a component of an integrated LED panel display system.

The LED wall may be, or may include, any suitable electronic display screen capable of controlling individual pixels or pixel clusters. The panel controller may receive, as a first input, video or static images from an image source (108). The video or static images may be rendered from a three-dimensional (3D) model, typically in real-time while shooting the scene 100 using one or more video cameras 110, 112. To shoot a scene in the system 100, one or more actors 116 may act in front of the LED wall 102 while a suitable still image or video for the scene is displayed on the display surface 104. Thus, the production crew can more conveniently portray action set in different scenes by changing the images displayed by the wall 102 and controller 106. While a single vertical wall 102 is illustrated, the LED wall may be extended to horizontal or inclined surfaces, for example covering the floor, ceiling, or side wall by joining panels to enclose a set and coordinating display on the panels using the controller 106.

Figure 2:
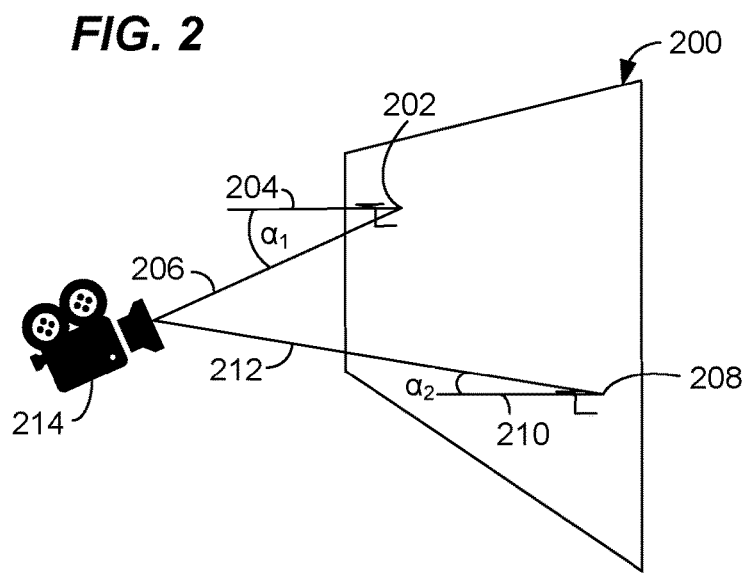
FIG. 2 is a schematic diagram illustrating various geometrical aspects of a camera aperture relative to pixels of an LED backdrop.

FIG. 2 illustrates geometrical relationships that are relevant to the visual effect caused by using an LED wall 200 as a backdrop in video production. For example, the spaced-apart points 202, 208 of the wall 200 each correspond to pixels of the LED wall with respective surface normals 204, 210, indicating the pixel's "on-axis" direction of maximal illumination. A first ray 206 cast from the camera 210 aperture to point 202, and a second ray 212 cast to point 208 each form a different angle $\alpha_1$ and $\alpha_2$ with the respective surface normal 204, 210. The angles $\alpha_1$ and $\alpha_2$ can be defined, for example, using spherical coordinates for each pixel and its surface normal relative to a datum of a coordinate system in which the camera 214 is located. That is, each pixel of the wall 200 has an individually-determinable viewing angle or "aspect" relative to the camera 214 aperture, and the aspects are generally unique for each pixel in the camera's 214 field of view, although symmetries may exist between certain of these pixels. The location of the wall 102 relative to each of the cameras 110, 112. and the orientation of the camera relative to the wall can be sensed using inertial sensors, positioning system (e.g., GPS) receivers, with other camera tracking and pose methods, or measured directly using rotational encoders on a tripod or crane camera mount. A processor in the camera controller 114 or in the panel controller 106 that receives the relative position and orientation data can compute the unique aspect for each pixel within the camera's field of view. In some embodiments, the processing may be performed in the rendering processor instead of the camera or panel controller since the rendering processor will need the camera location and orientation information to perform the correct rendering. The unique aspect between each pixel or cluster of pixels of the LED wall and the camera 214 may sometime be referred to herein as an angular offset between the camera and at least one pixel of an image displayed by the LED wall, or as an angle of emission from the LED wall.

It should be appreciated that what is true for individual pixels applies similarly to clusters of pixels around a common on-axis direction. Thus, the methods herein can be applied to control of individual pixels or pixel clusters, for example, clusters made up of 2, 3, 4, 9, 16 or 25 pixels clustered around a point without intervening pixels within outer boundaries of the cluster.

Figure 3:
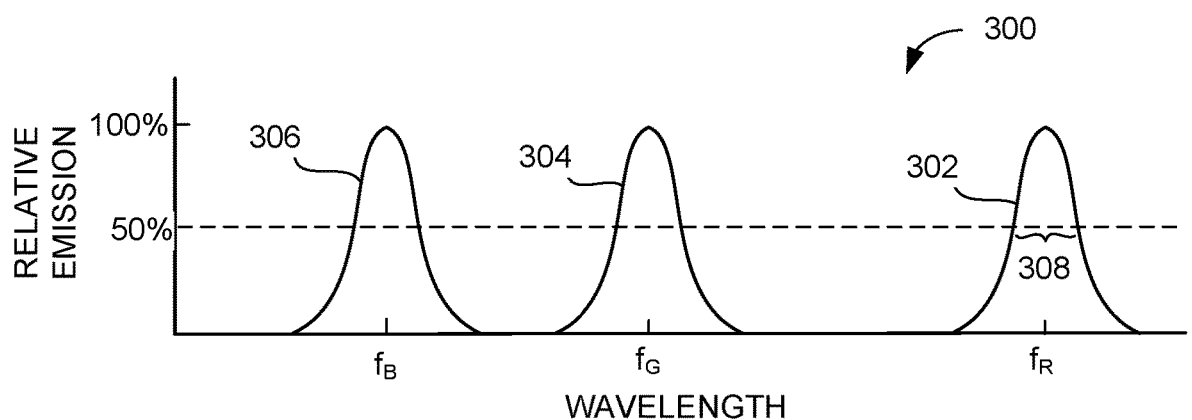
FIG. 3 is a diagram illustrating aspects of LED relative emission intensity to wavelength.
Figure 4A:
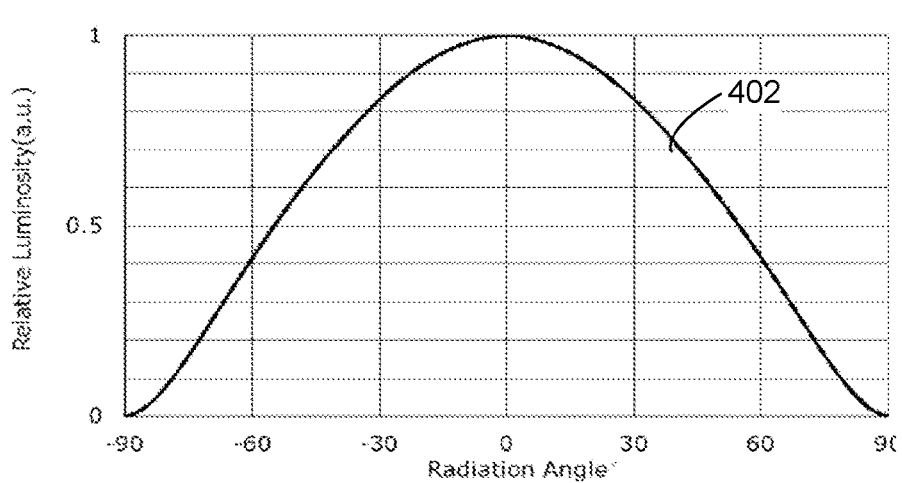
FIG. 4A is a diagram illustrating aspects of LED relative luminosity to viewing angle to the display plane.

FIGS. 3 and 4 illustrate certain generalized luminosity characteristics of LED elements used to illuminate individual pixels or pixel clusters. Each pixel may be illuminated by three or more LEDs each designed to radiate in a specific dominant wavelength. An LED element typically emits light at a range of wavelengths but is manufactured to hit a specific dominant wavelength and full width at half maximum (FWHM) bandwidth characteristic. For example, pixels are often illuminated by a set of red (R), green (G), and blue (B) LED elements, each radiating in a different portion of the visible spectrum. The graph 300 of FIG. 3 shows emission curves graphed in a relative emission intensity vs wavelength plot. As shown, a pixel's red element radiates over a curve 302 in longer wavelengths (lower frequencies) centered around a peak at $f_R$. Likewise, a green element radiates over a curve 304 centered around a peak at $f_G$, and a blue element radiates over a curve 306 centered around $f_B$. The emission curves 302, 304, 306 may be similar but are generally not identical, as the emission curve depends on physical characteristics of the light emitting device. Each emission curve can be characterized by a dominant wavelength and a bandwidth spread, which may correlate to a full-width-at-half-magnitude bandwidth 308 as shown in connection with the red element at $f_R$. The spread can also be correlated to a standard deviation, sigma which for a gaussian distribution has a relationship to the FWHM approximated as follows, FHWM=2.355*sigma The graph 400 of FIG. 4A shows an emission curve 402 for a single LED element plotted as relative luminosity vs display angle, wherein the zero angle point correlates to the on-axis or surface normal emission direction (perpendicular to the screen) while the −90° and +90° points indicate directions parallel to the display screen. The curve 402 may differ based on the emission frequency of the LED element, among other things. To account for such differences, individual pixels of the LED wall may be calibrated during scene setup or at the factory, for the on-axis peak and surrounding viewing angles. Such calibration can map variation in relative luminosity over the possible viewing angles from −90 to +90 degrees, which cause non-uniformities or other unintended visual effects when the difference between similarly-controlled pixels at different panel locations exceeds a perceptual threshold. A suitable perceptual threshold may be estimated using a contrast detection model like the Barton contrast sensitivity model, wherein a perceptual threshold of just noticeable difference is dependent on the stimulus's spatial frequency and luminance.

Figure 4B:
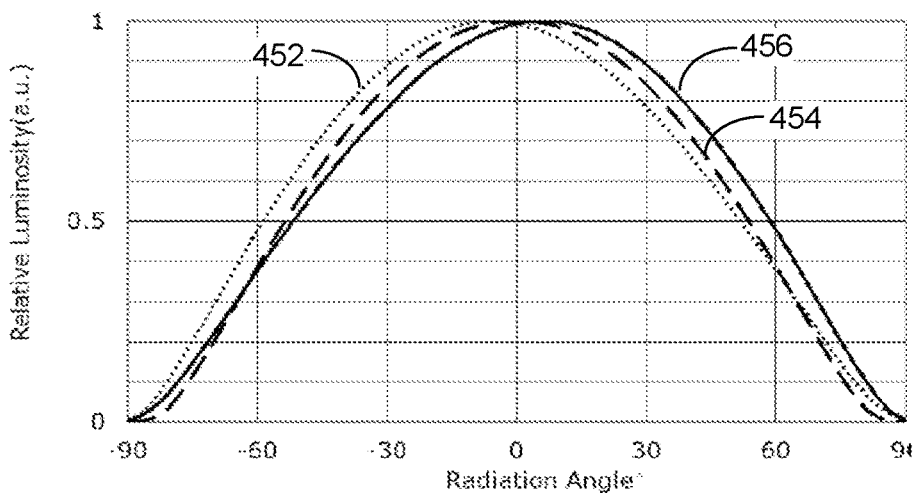
FIG. 4B is a diagram illustrating aspects of LED relative luminosity to viewing angle for different emission frequencies.

The graph 450 of FIG. 4B shows different emission curves 452, 454, 456, one for each color channel of an RGB LED light emitter. Differences between the curves may be explained at least partly by the different geometrical position of the LEDs in the panel. For example, the LED for each RGB color channel may be located at a different depth relative to the LED panel surface, or the individual LEDs of each RGB color channel may occlude the other sub elements at different angles. In many LED walls, the RGB elements for a single pixel are arranged vertically, which causes no significant occlusion off axis horizontally, but more occlusion off axis vertically. Consequently, color shift may be apparent when viewing the pixel off axis, depending on the viewing angle. To compensate for such misalignment of emission curves, a processor may perform attenuation calculations separately for each channel.

Referring again to FIG. 1, once each pixel is calibrated, the panel controller 106 may be programmed to accept a second input from at least one camera controller 114 comprising location and orientation data for the one or more cameras, or equivalent data, enabling computation of the viewing angle for each pixel in the one or more cameras' 110, 112 field of view. The panel controller 106 may compute an attenuation factor for each pixel, based on its calibration data, the viewing angle for the pixel, and an estimated perceptual threshold, for each frame. An example of a suitable algorithm is provided herein below. Other algorithms may also be operable.

Once it has calculated or otherwise obtained an attenuation factor, the panel controller 106 may then individually attenuate or boost the displayed output of each pixel in the field of view, based on a product or other suitable function of each pixel's individual attenuation factor and the pixel's input signal magnitude, for each color channel of the pixel. Thus, the output of the LED wall 102 is altered so that non-uniformities and artifacts caused by varying viewing angles fall below a set perceptual threshold.

FIG. 5 illustrates operations of a method 500 for controlling output of an LED wall during video recording of a scene, including alternative real-time or post processing options. The method 500 may be performed by one or more processors controlling output of an LED wall, either as part of a panel control device or larger system including camera controllers, during filming. In an alternative aspect, the method 500 can be performed in post processing of video without control of the LED wall itself, which is ideally suited for areas of the captured frame that is not occluded by actors or other object on set in front of the LED wall The method 500 may begin at 510, for a first frame of a video sequence, with at least one processor of a device or system obtaining a current position and orientation of a camera relative to an LED backdrop of a scene, for example by communicating with the camera's locating module. The position and orientation data may vary with each frame as the camera is moved and may be fixed for any number of frames when the camera is held stationary. The system processor may associate position and orientation data for a frame with relevant metadata for image processing, for example optical specifications for the camera and a frame number or other synchronization index that identifies which frame of the video backdrop is displayed by the LED wall.

At 520, the at least one processor may map pixels of the camera image to pixels output by the LED wall, based on the position and orientation of the camera relative to the LED wall, the fixed position and geometry of the LED wall, the optical specifications of the camera and LED wall, and the image displayed by the LED wall. The mapping may be one-to-many, one-to-one, or many-to-one depending on the optical specifications and relative positions of the camera and LED wall. In an aspect, the at least one processor may perform the mapping for each pixel of the camera image, which pixel may correlate to less than a pixel, a whole pixel, or a cluster of pixels of the LED wall. If the camera pixel correlates to less than a pixel of the wall, the mapping is many-to-one, meaning two or more camera pixels are capturing light from the same LED way pixel. More commonly, the mapping is one-to-one, or one camera pixel to a cluster of LED wall pixels. An output of the mapping may include an offset angle 'α' in one or more axes, for example orthogonal axes 'x' and 'y' of a Cartesian system or 'θ' and 'φ' of a spherical system, between each pixel of the camera image and a mapped pixel or pixel cluster of the LED wall. Offset angles in two or more coordinates can be combined to obtain an aggregate offset angle based on a known or assumed measure of spherical symmetry for luminosity of the LED element.

At 530, the processor calculates color attenuation factors, one for each color channel and axis of every pixel in the mapped image, which may be saved in a computer memory for application. More detailed aspects of calculating color attenuation factors are described in connection with FIG. 6 below. Each attenuation factor 'A' may be applied to an LED element of the backdrop to change an output 'O' of an LED element, for example a product 'AO.' In an alternative, an inverse of the factor may be applied in post processing to the camera image, to compensate for luminosity differences and color shifts caused by off-axis alignment as illustrated in FIG. 2. For the sake of brevity, both real-time and post processing options are described in connection with FIG. 5, although these are alternatives of which only one is selected in individual instances of the method 500.

At 540, if the selected alternative is a real-time control of the LED wall, the method flow proceeds to block 560. At block 560, the processor applies the attenuation factors to control output of each pixel of the LED wall, for example using a panel controller. If the selected alternative is post processing, at 550 the processor saves the attenuation factor in connection with each pixel of the image to be captured by the camera. In both alternatives, at 570, the processor captures the image for use in a next video frame. In embodiments, the image may be captured by a separate camera under a synchronization signal from the processor. In a post processing alternative, the camera may record index information with the image that associates it to the metadata saved at block 550.

At 580, the processor may determine whether the video shoot is completed and terminate at 585 when completed. If not completed, at 590 the processor progresses to preparing for the next video frame and loops back to block 510.

FIG. 6 illustrates operations of a method 600 for calculating color attenuation factors, which may be adapted for real-time or post processing implementation. For each pixel on the wall or clusters of pixels on the wall, the angular offset between the camera and wall angular offset is calculated in real time, using a real-time camera motion tracking system. Each LED element emits over a frequency bandwidth. The processor may approximate attenuation over a band by dividing the bandwidth into two or more frequency bands. In an alternative, the processor may process only a single frequency band for each element. While method 600 illustrates a sequence of operations, the processor may use matrix operations to perform the illustrated operations 600 in a more computationally efficient manner.

At 602, the processor may select a pixel, an offset axis of the pixel, a color channel of the pixel wherein each color channel correlates to a different LED element of the LED backdrop, and frequency band of the color channel. At 604, the processor calculates the angular offset for the selected pixel or cluster of pixels based on a current camera position and orientation relative to the LED wall, and on related camera parameters such as camera sensor or film dimensions, focal length, shutter speed, aperture, t-stop, and other relevant lens characteristics.

At 606, the processor may look up a relative luminosity of the LED element derived from calibration data. For example, suppose the pixels on the left of the camera frame have an offset of −30 degrees while on the right of the camera frame the offset is −5 degrees. The processor looks up the relative luminosity in a calibration table for −30 degrees. Suppose, for example, the calibration data specifies a relative luminosity of 75% at −30 degrees, and a relative luminosity of 90% at −5 degrees.

At 608, the processor calculates an attenuation factor based on the relative luminosity determined from calibration data, for example by computing a compensation factor per pixel computed as the inverse of the relative luminosity '$L_r$' ($1/L_r$) and apply the computed compensation factor to the linear signal for the pixels' display. Continuing the example, the processor may compensate the left-side pixels at −30 degrees by 1/0.75=1.333 and the right-side pixels at −5 degrees by 1/0.9=1.111. Once the compensation values of 133% and 111% are applied to the input image pixel values for the left and right-side pixels respectively, those pixels will appear in the camera captured image to not have changed in luminosity due to camera angle, ensuring the content is captured as the rendering software intended without any viewing angle distortion. In an aspect, the processor's function for compensation factor outputs spatially smooth results for adjacent pixels, and an inverse of the function may match the smooth shape of the model. It is important to note that this method does not correct for any vignetting or non-uniformity due to the camera lens itself. While camera distortions can be computed and corrected with other methods, this method is not a camera distortion method, it is a LED wall distortion correction method. It is important for the both the actors, objects on set, and the LED wall to be affected by the same lens distortion. Additionally, if the LED wall system does not have sufficient headroom to drive the panel at levels greater than 100%, then alternatively, the on-axis part of the wall can be attenuated to match the luminosity of the off-axis part of the LED wall that is in view. The on-set lighting can be dimmed accordingly by the same amount of attenuation.

Calculation of attenuation factors may be done separately for frequency sub-bands of an element's emission spectrum and aggregated to obtain an aggregate (integrated) attenuation factor for the element. Any integer number of sub-bands of one or greater may be used. At 610, if frequency sub-bands are used, the processor may determine whether all the sub-bands for the element are computed. If not, at 612 the processor may repeat the operations 602-608 for the next sub-bands. Once all sub-bands are processed, at 614 the processor aggregates attenuation factors for each sub-band, thereby preparing an aggregate attenuation factor for example by calculating an average or median value.

At 616, the processor may determine whether all color channels in the LED backdrop have been processed for the current pixel. If not, the processor at 618 selects the next channel identifier and reverts to block 602 to select the next frequency band for the identified channel. If all color channels are identified, at 620 the processor determines whether all axes for the current pixel have been processed. If not, at 622 the processor selects the next axis for the current pixel and reverts to block 602, where it selects an initial color channel and frequency band for the current pixel.

Once all axes for the pixel are processed, at 624 the processor combines the axes based on relative contribution of each axis to the total attenuation from the current point of view. For example, to combine attenuation factors for a ray having an angle α to a first axis 'X' perpendicular to a coplanar second axis 'Y', the processor may calculate a square root of a sum of the squares of the attenuation factors for the X and Y axes. The processor may store or return a combined attenuation factor for each color channel of the current pixel.

At 626, the processor determines whether an attenuation factor is calculated for each pixel of the captured image. If not, the processor selects the next pixel (block 630) and reverts to block 602. Once the image is finished, the processor may store the image as a video frame and advance to the next frame (block 628). While FIG. 6 shows calculation of attenuation for different axes, color channels and frequency bands of a pixel, the algorithm may be simplified to preserve processing resources if acceptable results can be obtained with lesser processing resources.

Once the attenuation values are applied to the input image pixel values, pixels at widely varying positions of the image will not change in appearance regardless of camera movement or viewing angle, ensuring the content is captured as the rendering software outputs without any viewing angle distortion compensation. Alternatively, the rendering output can be predistorted to compensate for the expected viewing angle distortion. In an aspect, functions calculating the attenuation factors should output spatially smooth results to avoid noticeable artifacts in the image results.

In another aspect, output of each LED element in response to inputs may be calibrated based on on-axis measurements. In virtual production, the only thing that matters to production is the image that is viewed from the camera, and the camera location is known to the system very accurately even when it is moved around. Thus, control of each LED element may make use of calibration for the angle of view between each LED element or group of adjacent elements in the LED wall and the camera. For each camera position and viewpoint, and optionally in response to camera movement, the panel controller may adjust luminance of each LED element based on a prior calibration for the nearest viewing angle or extrapolate between a pair of nearest viewing angles. Alternatively, the compensation of off-axis viewing angle can be occur in the rendering processor either as part of the rendering engine, or as a step that immediately follows rendering. Thus, the LED wall outputs an image that compensates for the difference between the on and off-axis performance, based on off-axis calibration factors. In a related aspect, the off-axis performance of each LED at multiple angles may be measured in the factory for the LED wall and provided as static calibration data to the panel controller. In an alternative, or in addition, the off-axis performance may be measured on set with a specific installation geometry, for example, to compensate for specific installation geometries such as curved screens, or abutting ceiling, floor or side LED panels.

In summary of the foregoing, and by way of additional example, FIG. 7 shows more general aspects of a method or methods 700 according to one embodiment, as may be performed by an LED wall controller as described herein. It should be appreciated that the more general operations of method 700 may include or embody more detailed aspects of corresponding methods described herein above. A computer-implemented method 700 for controlling individual pixels of an electronic display screen displaying an input image may include receiving 710, by at least one processor of a display controller, an output image from a camera capturing the display screen. The output image may be static or rendered as video, may be rendered from a computer model of the scene, or may be a photograph or video of a scene. The capturing may be performed synchronously or asynchronously with the camera capturing the display screen. For example, an output of the camera may be coupled to an input port of the at least one processor, which performs further processing at 720 without delay. In an asynchronous alternative, the camera, at least one processor receives the output image from an electronic memory, which may be coupled to the camera and/or to the at least one processor via a computer network.

The method 700 may include, at 720, estimating, by the at least one processor, a difference in perceptual aspect between each of one or more pixels of the output image and each of one or more correlated pixels of the input image. A perceptual aspect may include, for example, a measured difference in appearance (e.g., luminance, hue), an expected calculated difference in appearance based on a geometric factor (e.g., emission angle), or both. Optionally, at 730, the processor may determine whether the difference in perceptual aspect exceeds a perceptual threshold, and if not, omit the following operation 740.

If the difference in perceptual aspect exceeds a perceptual threshold, or if the operation 730 is omitted, the method 700 may include at 740 adjusting, by the at least one processor, at least one parameter for controlling display of the input image on the electronic display screen by an amount calculated, for the each of one or more correlated pixels of the input image, to reduce the difference. The at least one parameter may include, for example, luminance or equivalent measure of output from individual LED elements of the displays screen.

Individual control of each LED element by the method 700 is not limited to control based on a geometrical relationship between each element and an aperture of a camera capturing the shot. The method 700 may control the brightness and/or color output from one or more LEDs of the LED display units such that the rendered scene captured by the camera has high fidelity to the scene generated by the virtual data generator. For example, in an implementation, a processor analyzes an image captured by the camera of the entire rendered scene or a portion thereof to obtain color and/or brightness values. The processer compares obtained color and brightness values with the color and brightness values of the corresponding portion of the generated virtual scene. If the difference between the color and brightness values of the image obtained by the camera and the corresponding generated virtual scene is greater than a threshold, then the processor controls the color and brightness of the light output from the LED elements rendering the scene so that the difference in the color/brightness levels in the image obtained by the movie camera and the generated virtual scene is below a threshold. Thus, luminance adjustment may be an iterative process performed in real time.

In various implementations, the controller may be configured to change the color and brightness of the light output from the LED elements by changing the amplitude and/or frequency of the voltage/current driving the LED.

The method 700 may include any one or more additional operations 500, 600, 800 or 900 as described above and below herein. Each of these additional operations is not necessarily performed in every embodiment of the method, and the presence of any one of the operations does not necessarily require that any other of these additional operations also be performed.

For example, referring to FIG. 7, the method 700 may further include at 810 correlating, by the at least one processor, the each of the one or more pixels of the output image to corresponding ones of the one or more pixels of the input image. For example, as shown at 820, the correlating may correlate individual pixels of the output image to corresponding individual pixels of the input image on a one to one, one to many, or many to one basis. In an alternative, or in addition, at 830 the correlating 810 may correlate clusters of adjacent pixels of the output image to corresponding clusters of adjacent pixels of the input image.

Referring to FIG. 9 showing operations 900, at 910, the estimating is based on a geometric relation between the camera and one or more correlated pixels of the input image on the display screen. In an aspect, the geometric relation is a smooth function across neighboring pixels. At 920, the method 700 may include determining the geometric relation based on a current camera position and orientation relative to the display screen. At 930, the method 700 may include determining the camera position and orientation based on at least one of a predefined plan for motion of the camera, or sensor data indicating position and orientation of the camera. For example, a camera may be rotated on a stationary stand or car using an electronic motion controller that defines the position and orientation of the camera at each moment of time. Therefore, the angular offset between the camera and pixels of the display can be calculated asynchronously during pre-processing, and provided to the LED wall controller or rendering controller prior to shooting the scene. For further example, the processor may receive sensor data from the camera indicating a position and orientation of the camera relative to the display screen or other datum, or there may be other motion tracking systems on set that can be used to determine the camera position and orientation relative to the LED wall.

At 940, the geometric relation on which the estimating 720 is based may be, or may include, an angular offset between the camera and the one or more correlated pixels of the input image on the display screen. At 950, the estimating may include looking up the difference in perceptual aspect based at least in part on the angular offset in a lookup table or other suitable data structure. In an alternative, or in addition, at 960, the estimating 720 may include calculating the difference in perceptual aspect based on a continuous function of the angular offset, for example as shown in FIGS. 4A and 4B.

Referring to FIG. 10, the method 700 may include additional operations 1000. At 1010, the adjusting 740 may further include optimizing brightness of the display while preventing unintended variance between adjacent pixels from exceeding a perceptual threshold. Another problem with using LED backdrops is that the inherent uniformity of the individual LED elements may vary across the backdrop. As brightness is increased in all elements of the backdrop, differences in uniformity become more noticeable. One solution is to attenuate the luminosity of all LED elements in the backdrop, sacrificing brightness range for uniformity. However, using a set up as illustrated in FIG. 1, a panel controller 106 may optimize uniformity dynamically based on the current viewpoint and image in frame over a relevant period, for example for each static shot, or on a frame-by-frame basis if the camera is moving. Tradeoff between brightness range and uniformity may be more aggressive if determined individually per pixel, based on surrounding colors and luminance of nearby pixels. Because the LED controller changes brightness dynamically based on specific uniformity needs of a current frame, baseline brightness may be increased beyond what is possible with a static setting for the entire wall, without sacrificing visual uniformity.

At 1020, the receiving, estimating, and adjusting of the method 700 are performed separately for at least two cameras imaging the display screen at separate instants by synchronized camera shutters. In another aspect, LED output for different viewpoints of the same scene shot at the same time may be optimized by synchronizing the camera shutters in distinct phases with the LED output, such that the LED output is controlled separately for each phase. Traditional multiple camera shoots use "gen-lock" to align the frame periods and exposure periods, and many cinema cameras are operated with a 180-degree shutter, for which half the time the shutter is open and half the time the shutter is closed. These features may be used to optimize LED output during contemporaneous multiple-camera shoots, in which the shutters of the different cameras are set out of phase. While the shutter of camera 'A' is closed, for example, a 2nd camera may have its shutter open while the LED wall shows a different image that is optimized for the perspective of the 2nd camera. Likewise, the LED output is optimized for camera 'A' while its shutter is open and the shutter of the $2^{nd}$ camera is closed. If a shorter shutter period is used, for example 360/3=120 degrees, then 3 cameras may be used. The cameras' shutter periods do not need to be the same if the shutter period of all cameras adds up to being equal or less than the frame period. For example, a 3-camera shoot may include one camera operating with 180-degree shutter, one with 120-degree-shutter, and one with 60-degree shutter, all out of phase.

FIG. 11 is a conceptual block diagram illustrating components of an apparatus or system 1100 for controlling individual pixels of an electronic display screen displaying an input image as described herein, according to one embodiment. As depicted, the apparatus or system 1100 may include functional blocks that can represent functions implemented by a processor, software, or combination thereof (e.g., firmware).

As illustrated in FIG. 11, the apparatus or system 1100 may comprise an electrical component 1102 for receiving an output image from a camera capturing the display screen. The component 1102 may be, or may include, a means for said receiving. Said means may include the processor 1110 coupled to the memory 1116, and to the input device 1114, the processor executing an algorithm based on program instructions stored in the memory. Such algorithm may include a sequence of more detailed operations, for example, initiating a video session with a connected camera, receiving a data signal from the camera, and storing the received image data in a memory associated with a time stamp or frame indicator.

The apparatus or system 1100 may further comprise an electrical component 1104 for estimating a difference in perceptual aspect between each of one or more pixels of the output image and each of one or more correlated pixels of the input image. The component 1104 may be, or may include a means for said estimated. Said means may include the processor 1110 coupled to the memory 1116, and to the input device 1114, the processor executing an algorithm based on program instructions stored in the memory. Such algorithm may include a sequence of more detailed operations, for example, the operations 510-530 of the method 500, or the method 600.

The apparatus or system 1100 may further comprise an electrical component 1106 for adjusting at least one parameter for controlling display of the input image on the electronic display screen by an amount calculated, for the each of one or more correlated pixels of the input image, to reduce the difference. The component 1106 may be or may include a means for said adjusting. Said means may include the processor 1110 coupled to the memory 1116, and to the input device 1114, the processor executing an algorithm based on program instructions stored in the memory. Such algorithm may include a sequence of more detailed operations, for example, the operation 560 or the operation 624.

The apparatus 1100 may optionally include a processor module 1110 having at least one processor, in the case of the apparatus 1100 configured as a data processor. The processor 1110, in such case, may be in operative communication with the modules 1102-1106 via a bus 1112 or other communication coupling, for example, a network. The processor 1110 may initiate and schedule of the processes or functions performed by electrical components 1102-1106.

In related aspects, the apparatus 1100 may include a network interface module 1114 operable for communicating with a camera and LED wall over a computer network. In further related aspects, the apparatus 1100 may optionally include a module for storing information, such as, for example, a memory device/module 1116. The computer readable medium or the memory module 1116 may be operatively coupled to the other components of the apparatus 1100 via the bus 1112 or the like. The memory module 1116 may be adapted to store computer readable instructions and data for effecting the processes and behavior of the modules 1102-1106, and subcomponents thereof, or the processor 1110, or the method 500, 600, 700 or one or more of the additional operations 800, 900 described in connection with the method 700. The memory module 1116 may retain instructions for executing functions associated with the modules 1102-1106. While shown as being external to the memory 1116, it is to be understood that the modules 1102-1106 can exist within the memory 1116.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Program instructions may be written in any suitable high-level language, for example, C, C++, C #, JavaScript, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. In other words, the modules may be high-level modules only.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. As used herein, a "processor" encompasses any one or functional combination of the foregoing examples.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for controlling individual pixels of an electronic display screen displaying an input image, the method comprising:
   receiving, by at least one processor, an output image from a camera capturing the display screen;
   estimating, by the at least one processor, a difference in perceptual aspect between each of one or more pixels of the output image and each of one or more correlated pixels of the input image based on a geometric relation between the camera and the one or more correlated pixels of the input image, the geometric relation including an angular offset between the camera and the one or more correlated pixels; and
   in response to the difference being greater than a threshold, adjusting, by the at least one processor, at least one parameter for controlling display of the input image on the electronic display screen by an amount calculated, for each of the one or more correlated pixels of the input image, to reduce the difference.

2. The method of claim 1, wherein the one or more correlated pixels of the input image are correlated to the one or more pixels of the output image based on correlating clusters of adjacent pixels of the output image to corresponding clusters of adjacent pixels of the input image.

3. The method of claim 1, wherein the geometric relation is further determined based on a current camera position and orientation relative to the display screen.

4. The method of claim 3, further comprising determining the camera position and orientation based on at least one of a predefined plan for motion of the camera, or sensor data indicating position and orientation of the camera.

5. The method of claim 3, wherein the geometric relation is a smooth function across neighboring pixels.

6. The method of claim 1, wherein estimating the difference comprises looking up the difference in perceptual aspect based at least in part on the angular offset.

7. The method of claim 1, wherein estimating the difference comprises calculating the difference in perceptual aspect based on a continuous function of the angular offset.

8. The method of claim 1, wherein the at least one parameter comprises luminosity.

9. The method of claim 1, wherein adjusting the at least one parameter further comprises optimizing brightness of the display while preventing unintended variance between adjacent pixels from exceeding a perceptual threshold.

10. The method of claim 1, wherein the receiving, estimating, and adjusting are performed separately for at least two cameras imaging the display screen at separate instants by synchronized camera shutters.

11. The method of claim 1, wherein the receiving, estimating, and adjusting are performed asynchronously with the camera capturing the display screen, and the at least one processor receives the output image from an electronic memory.

12. The method of claim 11, wherein the electronic memory is coupled to the camera via a computer network.

13. The method of claim 1, wherein the angular offset is calculated in real time using a real-time camera motion tracking system.

14. The method of claim 1, wherein adjusting the at least one parameter includes determining a color attenuation factor associated with the one or more correlated pixels of the input image.

15. The method of claim 1, wherein individual pixels of the one or more pixels of the output image are correlated to corresponding individual pixels of the one or more correlated pixels of the input image based on at least one of a: one to one, one to many, or many to one basis.

16. An apparatus for controlling individual pixels of an electronic display screen displaying an input image, the apparatus comprising:
   at least one memory storing processor-readable instructions;
   at least one processor configured to access the at least one memory and execute the processor-readable instructions to perform operations, the operations comprising:
   receiving an output image from a camera capturing the display screen;
   estimating a difference in perceptual aspect between each of one or more pixels of the output image and each of one or more correlated pixels of the input image based on a geometric relation between the camera and the one or more correlated pixels of the input image, the geometric relation including an angular offset between the camera and the one or more correlated pixels; and
   in response to the difference being greater than a threshold, adjusting at least one parameter for controlling display of the input image on the electronic display screen by an amount calculated, for each of the one or more correlated pixels of the input image, to reduce the difference.

17. The apparatus of claim 16, wherein the geometric relation between the camera and one or more correlated pixels is further determined based on a current camera position and orientation relative to the display screen.

18. The apparatus of claim 16, wherein adjusting the at least one parameter includes optimizing a brightness of the display while preventing unintended variance between adjacent pixels from exceeding a perceptual threshold.

19. The apparatus of claim 16, wherein the angular offset is calculated in real time using a real-time camera motion tracking system.

20. The apparatus of claim 16, wherein adjusting the at least one parameter includes determining a color attenuation factor associated with the one or more correlated pixels of the input image.

* * * * *